United States Patent [19]
Thomas et al.

[11] Patent Number: 6,005,639
[45] Date of Patent: *Dec. 21, 1999

[54] VECTOR ASSIGNMENT FOR VIDEO IMAGE MOTION COMPENSATION

[75] Inventors: Graham Alexander Thomas, Tadworth; Michael Burl, London, both of United Kingdom

[73] Assignee: BBC, Broadcasting House, London, United Kingdom

[ * ] Notice: This patent issued on a continued prosecution application filed under 37 CFR 1.53(d), and is subject to the twenty year patent term provisions of 35 U.S.C. 154(a)(2).

[21] Appl. No.: 08/917,411

[22] Filed: Aug. 25, 1997

Related U.S. Application Data

[63] Continuation of application No. 08/667,494, Jun. 24, 1996, abandoned, which is a continuation of application No. 07/969,237, Mar. 10, 1993, abandoned.

[30] Foreign Application Priority Data

Sep. 20, 1990 [GB] United Kingdom ............... 9020197
Sep. 20, 1990 [GB] United Kingdom ............... 9020498

[51] Int. Cl.[6] ........................................... H04N 7/32
[52] U.S. Cl. ........................... 348/699; 348/416; 348/420
[58] Field of Search ........................... 348/384, 390–396, 348/400–402, 407, 409–413, 415, 416, 630, 699, 420; 382/232, 236, 238; H04N 7/137, 7/32

[56] References Cited

U.S. PATENT DOCUMENTS

| | | | |
|---|---|---|---|
| 4,862,267 | 8/1989 | Gillard et al. ........................... | 348/699 |
| 4,882,613 | 11/1989 | Masumoto ............................... | 348/630 |
| 4,937,666 | 6/1990 | Yang ....................................... | 348/413 |
| 5,012,337 | 4/1991 | Gillard .................................... | 348/699 |
| 5,025,495 | 6/1991 | Avis ........................................ | 348/699 |

FOREIGN PATENT DOCUMENTS

| | | |
|---|---|---|
| 0 294 961 | 12/1988 | European Pat. Off. . |
| 0 344 843 | 12/1989 | European Pat. Off. . |
| 0 395 263 | 10/1990 | European Pat. Off. . |
| 2 188 510 | 9/1987 | United Kingdom . |
| 2 231 225 | 11/1990 | United Kingdom . |
| 2 231 743 | 11/1990 | United Kingdom . |

OTHER PUBLICATIONS

H.C. Bergmann, "Motion Adaptive Frame Interpolation". Proceedings of the International Zurich Seminar on Digital Communications, Mar. 1984, pp. D2.1–D2.5.

G.A. Thomas, "Television Motion Measurement for DATV and Other Applications" BBC Research Department Report No. 1987/11, pp. 1–19.

"Signal Processing of HDTV, II", Proceedings of the Third International Workshop on HDTV, Turin, Italy, $30^{th}$ Aug. to $1^{st}$ Sep., 1989, pp. 649–655.

G.A. Thomas et al., Generation of High Quality Slow–Motion Replay Using Motion Compensation, Int'l Broadcasting Convention, Brighton, UK, Sep. 21–25, 1990.

Journal IEEE Transactions on ConsumerElectronics, vol. 36, No. 3, Aug. 1990, pp. 395–402.

*Primary Examiner*—Richard Lee
*Attorney, Agent, or Firm*—Dike, Bronstein, Roberts & Cushman, LLP; George W. Neuner

[57] ABSTRACT

The appropriate one of a list of possible motion vectors is applied to each region of a video image. An image value for that region is determined for each of four successive fields, for each of the possible motion vectors. The values for these four fields are compared and when the values are substantially the same for a given vector it is assumed that is the vector appropriate to that region. The vectors appropriate to regions of obscured or revealed background can also be assigned by comparing inter-field differences and determining regions where the inter-field differences are high for the central pair and one outer pair and low for the other outer pair of fields. To generate regions corresponding to obscured background only information from the earlier fields is used and to generate regions corresponding to revealed background only information from the later fields are used.

26 Claims, 5 Drawing Sheets

VECTOR ASSIGNMENT FOR VIDEO IMAGE MOTION COMPENSATION

This application is a continuation of application(s) Ser. No. 08/667,494 filed on Jun. 24, 1996, now abandoned, which application is a continuation of application(s) Ser. No. 07/969,237 filed Mar. 10, 1993, now abandoned.

BACKGROUND OF THE INVENTION

This invention relates to video image processing, and more particularly to the assigning of motion vectors indicating the direction and magnitude of apparent movement to different regions of the image, to assist in the generation of desired output images.

Our United Kingdom Patent No. GB-B-2,188,510 and BBC Research Department Report RD 1987/11 describe a method of processing a video image so as to provide a list of motion vectors which are applicable over the whole area and one of which may be regarded as applying to each region of the image. Other methods are also possible for generating such a list of motion vectors. To use such vectors it is then necessary to select which of these vectors may apply to given regions of the picture. Each region may be as small as a picture element (pixel) or it may comprise a plurality of picture elements or a block of the picture.

The motion vectors may be used, for example, to generate output fields which correspond to an instant in time which lies intermediate the time of two input fields. This may be required for instance in producing slow motion effects, in transferring video images to or from film, or in standards coversion.

One of the most challenging applications of motion compensation is to generate slow-motion sequences without the jerky motion that results from simply repeating each image a number of times. Knowledge of the motion vector of each object in the image allows new images corresponding to any time instant to be generated showing the objects correctly positioned. The use of such a technique in conjunction with a shuttered CCD camera should allow sharp smoothly-moving pictures to be generated with a quality approaching that obtainable from a high frame-rate camera, without the operational problems that the use of such a camera would entail.

A typical image may be regarded in its simplest form as having a moving foreground region and a background region, as illustrated somewhat diagrammatically in FIG. 1 of the drawings. At (a) is shown one field of an image comprising a foreground object, such as a ball, in front of a background. At (b) is shown the next field of the image. The ball will have moved from position A to position B. Looking at image (b), part of the background which was seen in (a) is now obscured, and part of the background which was not seen in (a) is now revealed or uncovered.

In general the background may also be "moving" in the image if, for example, the camera is being panned. Thus motion vectors will be associated both with the foreground and with the background respectively. The appropriate motion vector is chosen in each case from the list of possible motion vectors (which has been produced eg. as described in our aforementioned patent) by comparing the two successive fields and looking at the movement which has taken place over different regions of the image.

This operation will provide accurate information over most of the picture area. Thus the background which is not covered by either image position of the ball, A or B, can be compared between the two images. Also the overlap region covered by both position A and position B of the ball can be compared to provide an appropriate vector. However in both the area of obscured background and the area of revealed or uncovered background, one of the fields contains an image of the ball and the other an image of the background. These can not be meaningfully correlated.

Many motion estimation algorithms have been proposed, see e.g. Proceedings of the International Zurich Seminar on Digital Communications, March 1984, pages D2.1–D2.5, Bergmann, H. C., "Motion-adaptive frame interpolation". Most can not detect motion in such regions, or can detect such regions only when the background is stationary, but of those that can detect its existence we do not believe that any can determine the direction or magnitude of motion of the region at the time that it disappears from view or when it reappears.

European Patent Application No. EP-A-0 395 264 published Oct. 31st, 1990 describes equipment for converting an 1125/60/2:1 HDTV signal into a 24 Hz progressive (non-interlaced) format for recording onto film, which uses a motion estimation technique which comprises a two-stage algorithm in which the first stage comprises correlating (by block matching) relatively large areas of the image to determine a list of possible motion vectors, followed by an assignment process to allocate vectors to individual pixels. In this assignment process, vectors are assigned to pixels in existing input fields, and this information then has to be converted to refer to pixels in desired output fields. Three input frames are used in the comparison.

SUMMARY OF THE INVENTION

The present invention is defined in the appended claims to which reference should now be made.

In a preferred embodiment of the invention, an image value for each region of a video image is determined for each of four successive fields, for each one of a list of possible motion vectors. The values for the four fields are compared, and when the values are substantally the same for a given vector, it is assumed that that is the vector appropriate to that region. The vectors appropriate to regions of obscured or revealed background can also be assigned by comparing inter-field differences and determining regions where the inter-field differences are high for the central pair and one outer pair and low for the other outer pair of the group of four fields.

Output fields can be generated by interpolation. To generate regions corresponding to obscured background, only information from the earlier fields is used and to generate regions corresponding to revealed background only information from the later fields is used.

BRIEF DESCRIPTION OF THE DRAWINGS

The preferred embodiment of the invention will be described in more detail, by way of example, with reference to the drawings, in which.

DETAILED DESCRIPTION OF THE PREFERRED EMBODIMENT

Figure 1:
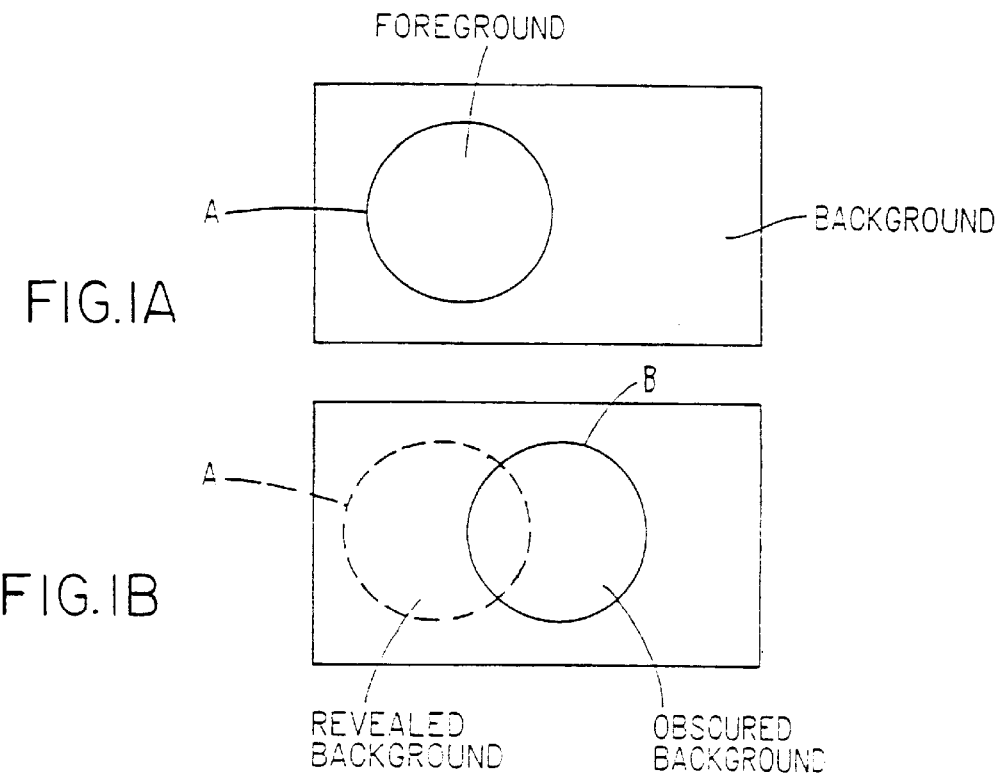
FIG. 1 (referred to above) shows two successive fields of a sequence of video images in which movement of a foreground object takes place.
Figure 2:
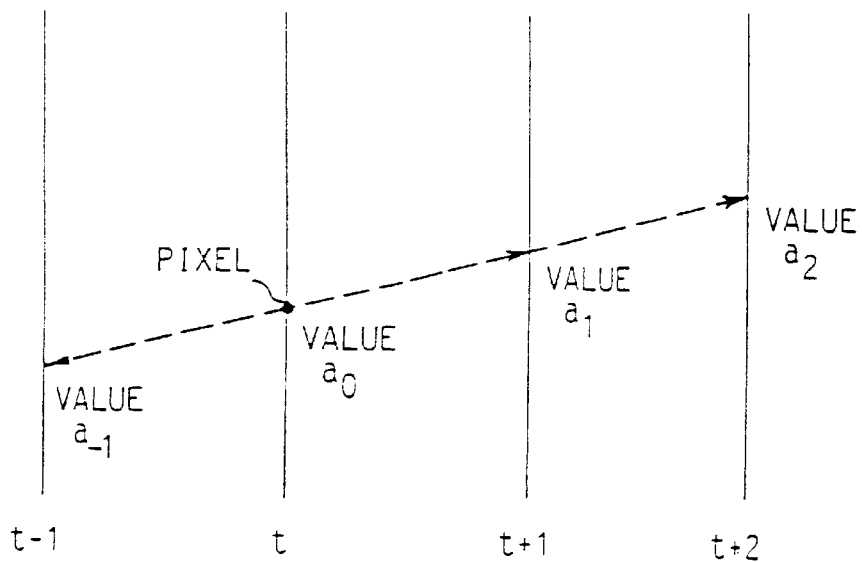
FIG. 2 is a diagram illustrating corresponding points on four successive fields for a given motion vector.

If it is assumed that the whole image is displayed in accordance with the same trial motion vector, that is one of the vectors in the list of possible motion vectors, then the value of any pixel can be estimated by looking back to the point in the previous field which is displaced by the amount of that vector. Alternatively, taking any given field as a datum, one can look backwards and forwards and for each pixel in the datum field generate what value that pixel would be at the time of occurrence of the preceding and subsequent fields. This is achieved by looking at the points in those previous and subsequent fields which are displaced from the pixel in the datum field by an amount appropriate to that motion vector. This operation is illustrated in FIG. 2 which diagrammatically illustrates four fields of a video signal at times t−1, t, t+1 and t+2 respectively. On the vertical axis is shown in one dimension a spatial section across the image. Due to motion the points that correspond on the different fields are spatially displaced.

Thus, for any given motion vector, one can build up, for each pixel in the datum field, the values that that pixel is expected to have in a succession of fields. If the motion vector is indeed the correct one for that pixel, those values are likely to be more or less the same. If the operation is repeated for all possible motion vectors, then the vector which produces the least variation in the values obtained is likely to be the appropriate vector for that pixel. The values can be processed to give a measure of assignment error, as described below, for each pixel and each vector.

Figure 3:
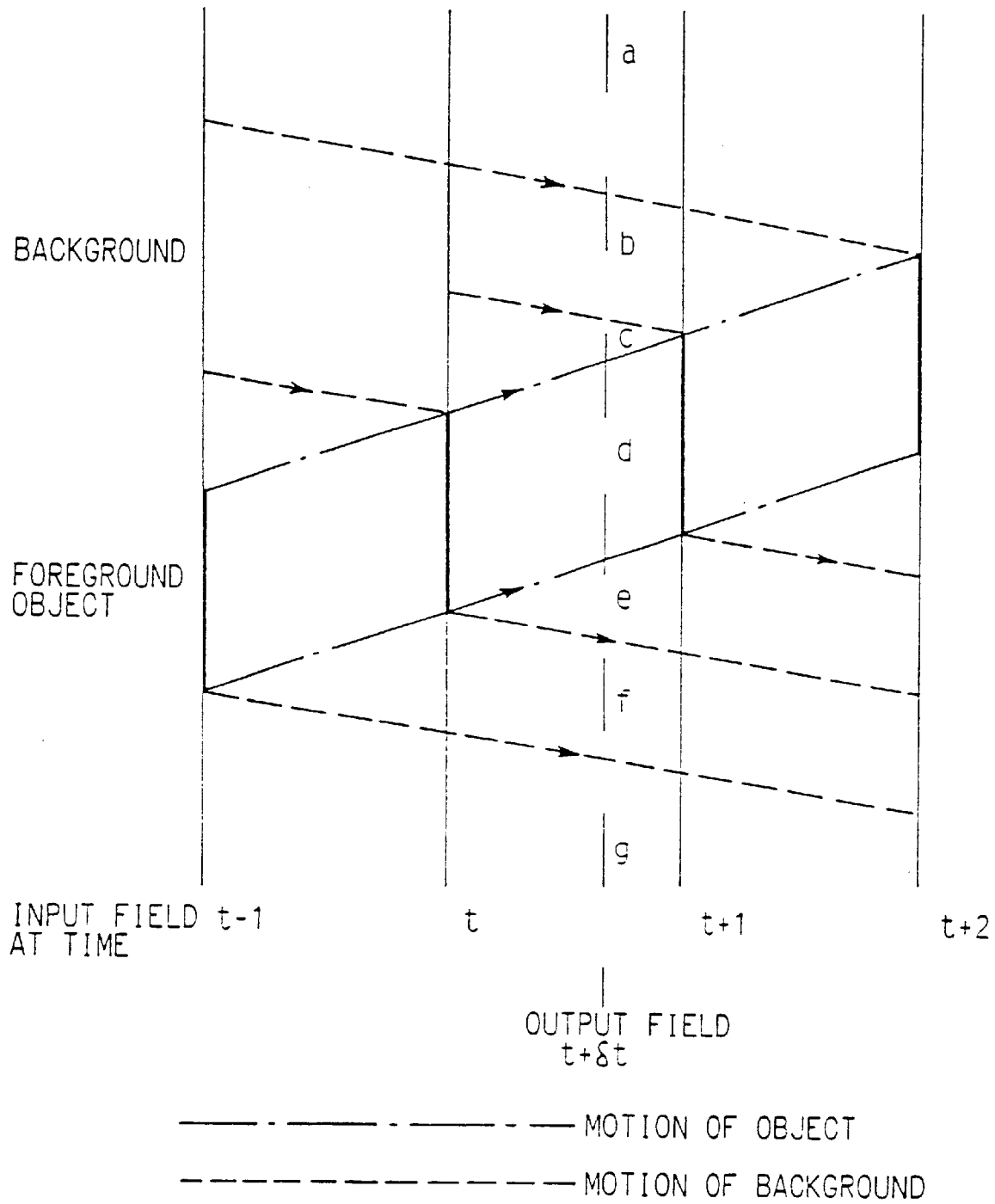
FIG. 3 is a diagram illustrating movement of foreground and background as between the four successive fields.

In accordance with this invention, therefore, we propose using the content of four successive fields to determine the appropriate motion vectors for the various regions of the image. Reference is made to FIG. 3 which likewise diagrammatically illustrates four fields of a video signed at times t−1, t, t+1 and t+2 respectively. On the vertical axis is shown in one dimension a foreground object moving over a background which is itself moving. As seen in the figure the foreground object is moving steadily upwards between fields t−1 and t+2 whereas the background is moving more slowly downwards.

Existing systems compare the two central fields t and t+1 and are unable to determine the vector appropriate to certain regions of the image. In particular they are unable to determine the vector appropriate to the region marked c, which represents background which is obscured between fields t and t+1, or the vector appropriate to the region marked e, which represents revealed background.

The motion vectors may be used in an interpolation operation to generate an output field at an instant t+δt corresponding to a time intermediate between fields t and t+1. By making use of all four fields, detection of the motion vector is not just more accurate, but also it becomes possible to allocate vectors to the regions c and e of the picture. The processing applied to each of the different regions a to g shown in FIG. 3 is as follows:

Regions a and g: The motion vector of the background gives a low assignment error across all four fields, so four-field interpolation may be used.

Region b: The motion vector of the background gives a low assignment error between the central fields, but not across all four; two-field interpolation across the central fields is used, or possibly extrapolation of the field at time t if the assignment error across the first two fields is smaller than that across the central fields.

Region c: The background vector gives a low error across the first two fields only; no other vectors give a low assignment error across any time period. The area is thus flagged as 'obscured' and extrapolated from the field at time t using the background vector.

Region d: The motion vector of the object gives a low four-field assignment error, so four-field interpolation is used.

Region e: The background vector gives a low assignment error over the last two fields; no other vectors give a low assignment error across any time period. The area is thus flagged as 'revealed' and extrapolated from the field at time t+1 using the background vector.

Region f: The background vector gives a low assignment error between the central fields but not across all four; two-field interpolation across the central fields is thus used, or possibly the field at time t+1 is extrapolated if the assignment error across the last two fields is smaller than that across the central fields.

Thus vector assignment is possible for all the image regions illustrated whether on a pixel-by-pixel or a block-by-block basis. Regions corresponding to obscured background are generated using only information in preceding fields, and information in areas of revealed background using only following fields.

The manner in which the assignment errors are generated will now be described. Four fields of the video signal are made available simultaneously by suitable storage. For each trial vector, the four values along the proposed motion trajectory are determined (see FIG. 2). The values taken are the luminance values of the signal. The motion vector may be determined to an accuracy of better than one pixel and when this is the case the motion trajectory will not pass exactly through existing sample positions on fields t−1, t+1 or t+2. A spatial interpolator is then used to calculate the luminance values appertaining to the nearest pixel positions in those fields.

The four values thus obtained are passed through a high-pass filter which measures the amplitude of the time-varying luminance component. Many filter responses are possible but an example of a possible filter response which provides a weighted average of the modulus of the differences is:

$$0.25 \times \{|a_{-1}-a_1|+|a_0-a_2|\}+0.125 \times \{|a_{-1}-a_0|+2|a_0-a_1|+|a_1-a_2|\}$$

Thus a value is obtained for each pixel position. The values across the image are then smoothed by being applied to a spatial low-pass filter, to form a four-field vector assignment error for each vector. For each pixel the magnitudes of the four-field vector assignment errors for all the possible trial vectors are then compared. If the magnitude of the lowest four-field vector assignment error is below a given threshold, then the corresponding vector is assigned to that pixel and the pixel is flagged as undergoing a simple translational motion.

If the lowest four-field assignment error is above this threshold, then the differences between successive fields are examined for all the trial vectors in order to determine which vector and time period gives the lowest error, as described above with reference to FIG. 3. For example, if the region corresponds to revealed background, then $|a_1-a_2|$ would be expected to have a small amplitude for the correct motion vector, whereas $|a_0-a_1|$ and $|a_{-1}-a_0|$ would be high.

Similarly, a region of obscured background would give rise to a low amplitude of $|a_{-1}-a_0|$. If the lowest value was for the central time period, then it might be concluded that the region had just been revealed or was about to be obscured. The three errors are subjected to a spatial filter and preferably multiplied by weighting factors before they are compared. The weighting factors are chosen to ensure that an area is flagged as revealed or obscured background only when the error for one of the outermost field periods is significantly less than for the central period.

Figure 4:
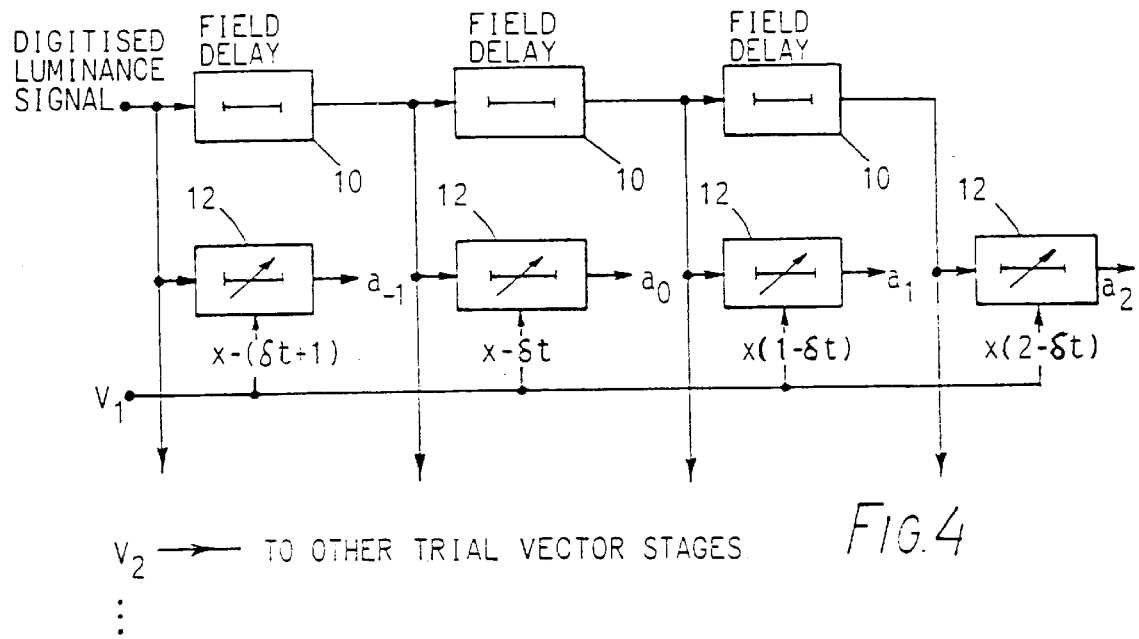
FIG. 4 is a block diagram of apparatus for obtaining four luminance values along a trial motion trajectory.

A possible hardware implementation of the method of FIG. 3 will now be described with reference to FIGS. 4 to 6. FIG. 4 shows how the four luminance values along a trial motion trajectory may be obtained. Three fixed field delays 10 are used to provide signal values from four successive field periods. Variable delay 12 are used to perform the shift in accordance with the trial vector value, multiplied by a value corresponding to the time period between the relevant incoming field and the time for which the vector field is being generated. Such variable delays can be easily implemented using a number of random-access memories addressed by appropriate read and write pointers. In an embodiment where the fields are displaced to sub-pixel accuracy, each shifter is replaced by a number of shifters to provide the values of surrounding pixels; these values are then fed to a spatial interpolator to perform the sub-pixel part of the shift. Such an interpolator is well-known.

Figure 5:
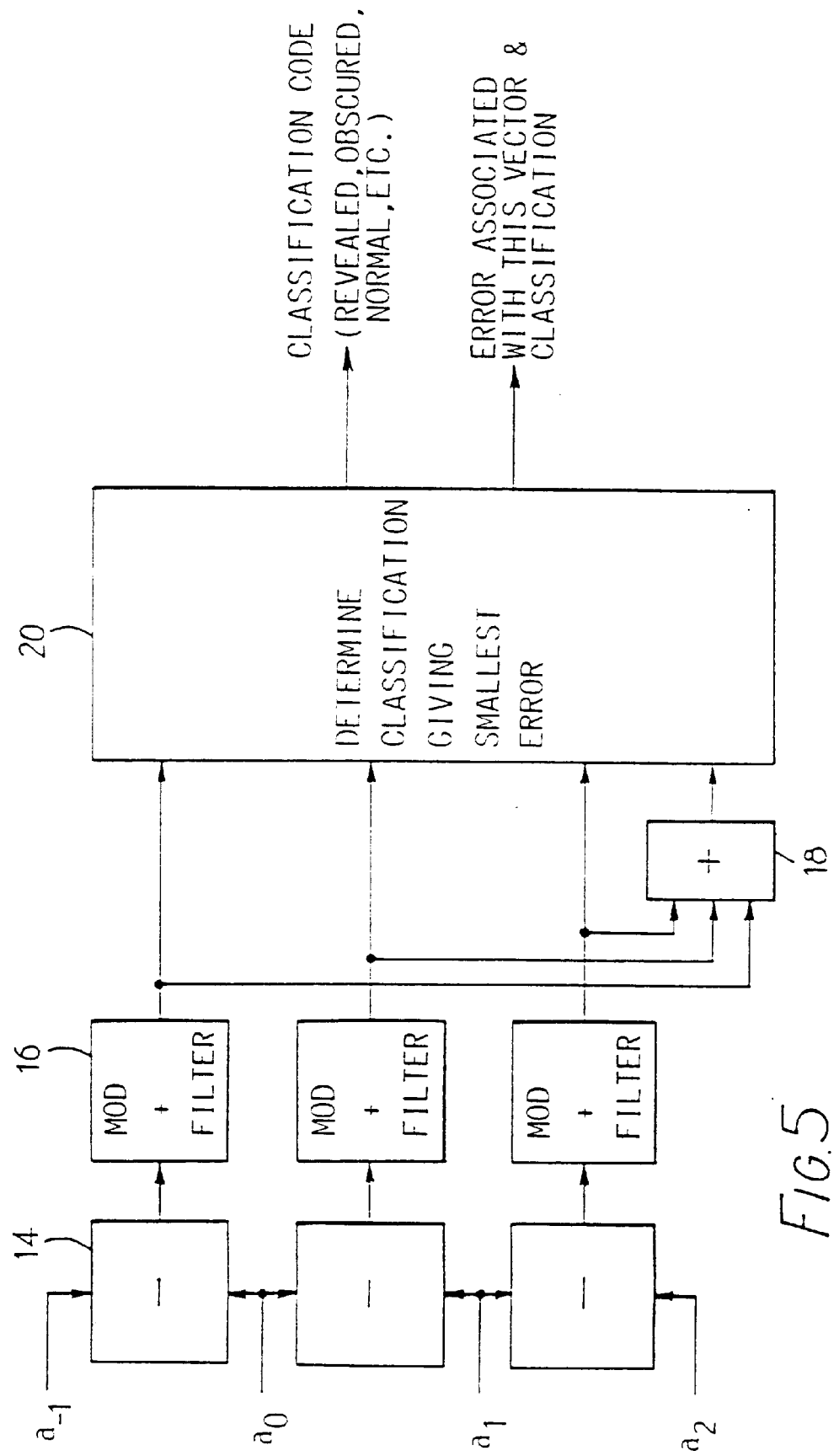
FIG. 5 is a block diagram of apparatus for calculating assignment errors.

FIG. 5 shows a possible arrangement for calculating four-field and two-field assignment errors from the luminance values calculated in FIG. 4. The errors are calculated using subtractors 14 followed by circuits 16 to calculate the modulus of the field difference. The modulus differences are spatially filtered to form the two-field errors; these are used to calculate the four field error. Integrated circuits are available that could be used to perform such spatial filtering; an example is the Inmos A110. In this example, the four-field error is simply derived in a summer 18 from the sum of the three two-field errors; a more complex high-pass filter arrangement can also be used as explained earlier. These errors are passed to a decision circuit 20, which makes a decision based on the values of the errors in relation to each other and to given threshold values and weighting factors as described earlier. Such a circuit can be constructed from components such as comparators and logic gates.

Figure 6:
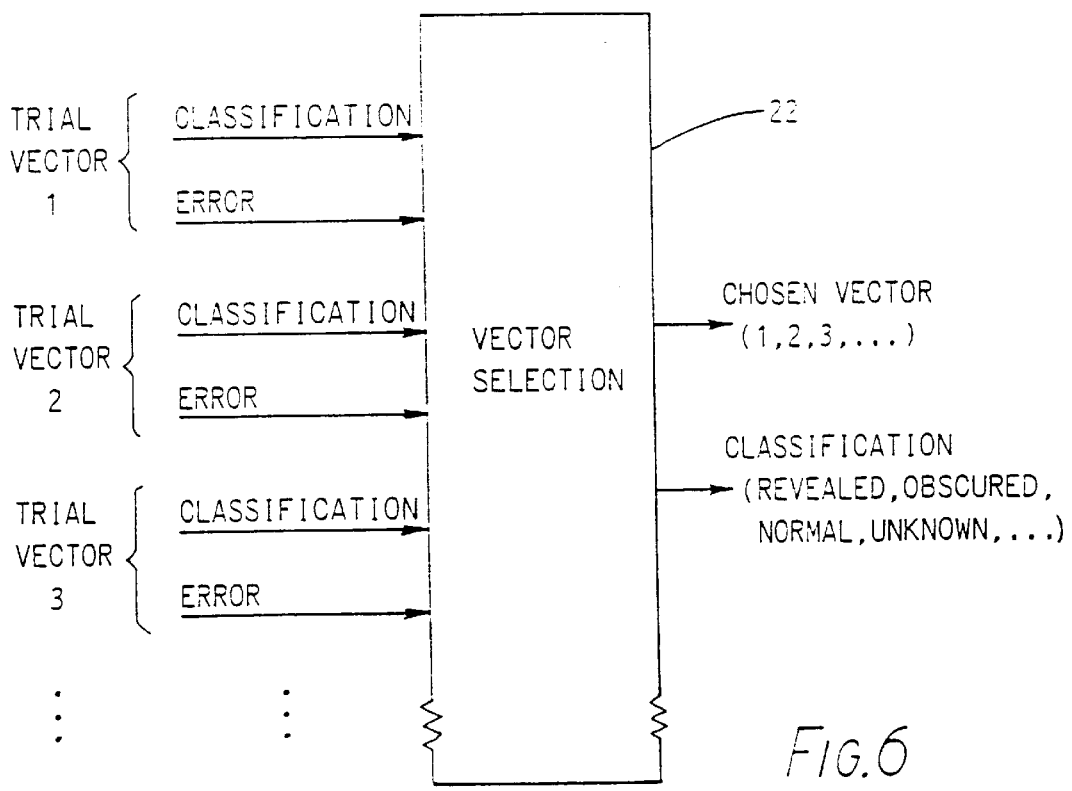
FIG. 6 illustrates a circuit for comparing classification codes and errors.

FIG. 6 shows how the classification codes and errors associated with each trial vector are compared in order to arrive at a final decision. This involves comparing the errors for each vector using comparators to determine the smallest. The errors may be weighted prior to comparison depending on their classification; such a weighting could be carried out by using a programmable read-only memory 22, addressed by the error value and the classification code. The number indicating the chosen vector may be converted easily into the horizontal and vertical vector components of that vector by using the number to address a look-up table containing the list of trial motion vectors.

Image interpolation using the vector and classification information obtained as described above may be carried out easily using an arrangement of field delays and variable delays very similar to that shown in FIG. 4. The variable delays are controlled by the chosen vector; the four luminance values obtained are passed to a four-tap filter whose coefficients are determined by the classification code and the temporal position of the field to be generated. Such a filter may be constructed easily using adders and multipliers, together with read-only memories to hold the filter coefficients.

As an alternative to using field differences as a measurement of assignment error, it is possible to form a more accurate measure by taking account of the luminance gradient in the region of each pixel. This allows less weight to be given to errors in highly detailed areas and is advantageous since a small inaccuracy in a motion vector may cause a high field difference in such a region. A suitable method of calculating assignment errors is as follows:

assignment error=(|difference|+const)/(|gradient|+const)

where:
difference=$(a_0-a_1)$ (in the case of the assignment error between the first two fields);
const is a constant whose function is to reduce problems from noise and zero gradients, for example equal to 4 luminance quantisation levels;
and gradient=square root $\{(Y(x-1,y)-Y(x+1,y))^2+(Y(x,y-1)-Y(x,y+1))^2\}$ where
Y(x,y) is the luminance level in the input field closest in time to the time instant at which the vector field is being generated, (x,y) being the coordinates in this image through which the motion vector under consideration passes.

This technique can be used when calculating any of the assignment errors. The resulting errors are subject to a spatial low-pass filter as described above.

A further possible enhancement to the calculation of assignment errors is to include information from the chrominance signal in addition to that from the luminance as described so far. Two chrominance assignment errors may be calculated in the same way as described for the luminance, by using the so-called U and V chrominance signals. The chrominance assignment errors are then added to that obtained from the luminance component to give a combined assignment error signal which may be more reliable than a luminance-only signal in picture areas with little luminance detail but significant chrominance detail.

If all the assignment errors are large then it can be concluded that no vector matches the motion; the pixel is then flagged as having an unknown vector.

If two or more vectors give similar low assignment errors, it is possible that the incorrect vector may be selected. In practice this is only a problem if the vectors have significantly different values. In one embodiment of the invention, the reliability is improved in this circumstance by repeating the entire assignment process using spatial filters with larger apertures, until a unique vector is found. Alternatively, the spatial filtering of the error signals may be performed in parallel using a plurality of filter apertures and the signal from the smallest filter aperture which gives a unique answer is used. If no unique vector can be found which gives a low assignment error, the pixel is then flagged as having an unknown motion.

More sophisticated methods of combining and weighting the match errors between successive fields may be used to improve the reliability of the vector assignment process. For example, in a preferred embodiment of the invention, seven match errors are calculated from three unweighted match errors as follows:
First, calculate three unweighted assignment errors E0, E1 and E2 using the gradient method described above; E0 being the assignment error between the first two of the four fields determined using $(a_0-a_1)$, E1 being between the central two and E2 being the error between the last two.

Then, calculate seven errors W0–W6 based on weighted combinations of E0, E1 and E2:

$W0 = E0 * \text{first\_wt}$ $W1 = E1 * \text{one\_wt}$ $W2 = E2 * \text{second\_wt}$ $W3 = (E0+E1)/2 * \text{two\_wt}$ $W4 = (E1+E2)/2 * \text{two\_wt}$ $W5 = (E0+E2)/2 * \text{two\_wt}$ $W6 = (E0+E1+E2)/3 * \text{three\_wt}$ The weighting factors may be constants chosen to optimise the operation of the vector selection process, or may be functions of parameters such as the magnitude of the trial vector, the assignment filter spatial aperture limensions and the output field position.

In one embodiment, first_wt and second_wt are functions which vary in such a way as to reduce problems at object boundaries when background and foreground vectors compete; in such regions the spatial low-pass filter applied to E0–E2 tends to cause the background vector to be selected just inside the edge of the object. The following formula may be used for these two weighting factors:

$\text{first\_wt} = 1 + (\delta t * \text{vector length})/\text{aperture length}$ $\text{second\_wt} = 1 + ((1-\delta t) * \text{vector length})/\text{aperture length}$ where $\delta t$ is the output field position in the range 0–1 as shown in FIG. 3, and aperture length is the size of the spatial filter applied to the assignment errors E0–E2.

These weighting factors can be limited to a fixed maximum value in the case of very large vectors.

The other weighting factors (one_wt, two_wt and three_wt) are constants chosen to be smaller than unity and so are always less than first_wt or second_wt. This ensures that vectors representing foreground are favoured in relation to those indicating revealed or obscured background. This is because it is subjectively much better for background around the edge of a moving object to be treated as foreground (becoming slightly blurred) than for edges of a foreground object to be treated as background (causing holes to appear in the object).

For each trial vector, the weighted sums W0–W6 are compared and for each sample the smallest is selected. According to this selection, the vector and area classification are made: If W1, W3, W4, W5 or W6 are the smallest, the corresponding vector as assigned and flagged as foreground. If W0 is the smallest, the corresponding vector is assigned and flagged as obscured background. Similarly if W2 is the smallest, the vector is flagged as representing revealed background. As mentioned previously, if the smallest error is above a preset threshold then the pixel may be flagged as having an unknown vector.

The vector and area classification information obtained may be subjected to additional post-processing if required; this may include the use of low-pass or median spatial filters. Such filters are well-known.

As has been noted with reference to FIG. 3, the vector and classification information obtained from the operation described above finds particular application in the temporal interpolation of image sequences. Such applications include the generation of high quality slow motion replay, standards conversion between different field-rates, and the interpolation of images in film sequences to increase the display rate to that of television.

Referring again to FIG. 3, an output image is shown as being interpolated at an arbitrary time between existing fields. The calculation of the coefficients for the two-field and four-field interpolation filters is a relatively simple and well known process. The figure does not show any regions to which no vector could be assigned; such regions are interpolated using a non-adaptive four-tap temporal filter, the response of which may be similar to that of the motion-compensation four-tap filter used in regions a, d and g in FIG. 3.

In one embodiment of the invention, the vector selection process may be extended to allow up to two vectors to be generated for each output pixel in regionss of revealed and obscured background. This allows a soft switch between vectors used for image interpolation at junctions between foreground and background objects. For example, for each pixel that is assigned as revealed background (i.e. the lowest weighted assignment error occurred between the last two fields), the vector giving the minimum assignment error over the first two fields is also determined. The output image is then interpolated from the following fields shifted by the assigned revealed background vector (scaled for the required output time) as previously described, together with a contribution from the preceding fields shifted by this secondary vector. The relative proportion of the two contributions may be determined as follows: A control signal is calculated for each pixel to be interpolated, specifying the fraction of the output image to be taken from the following fields. For all samples in foreground areas, this will be a constant equal to $\delta t$ in FIG. 3, this being the normal mode of operation of a temporal interpolation filter. In a region flagged as revealed background, the control signal will be set equal to unity, since all information should be taken from following fields as described earlier for region e in FIG. 3. This control signal is then subject to a low-pass spatial filter, so that it will no longer be equal to unity just inside regions of revealed background.

Figure 7:
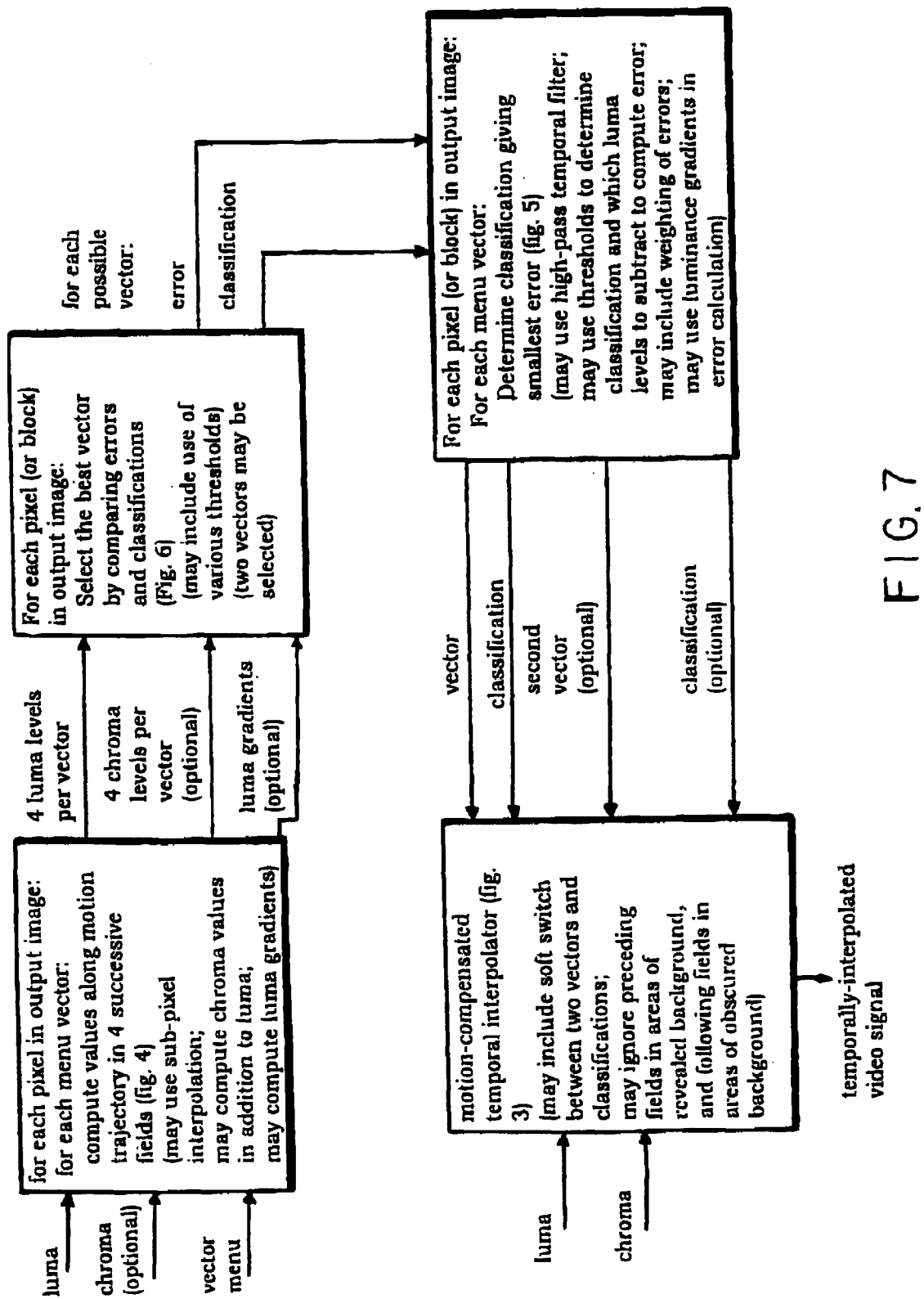
FIG. 7 illustrates a flow chart of the inventive technique.

FIG. 7 shows a flowchart illustrating the steps involved in the inventive technique, as fully explained above with respect to the other figures.

Both the vector assignment and the temporal interpolation processes have been described without reference to interlace. Both processes can be applied directly to an interlaced signal (taking account of the vertical positioning of the sampled lines); alternatively an interlaced signal can be converted to a sequential or progressive form prior to processing.

It will appreciated that in the unusual event that it is only desired to detect either obscured background or revealed background, but not both, then only three successive fields need to be compared.

For a block diagram of a slow-motion replay system in which the invention can be incorporated, reference is made to IEE Conference Publication No. 327 (IBC'90) pages 121 to 125, the disclosure which is hereby incorporated by reference, and to the references listed in that paper.

It will also be appreciated that the operations described above will generally be implemented by a computer system rather than by discrete circuitry. The above operational description provides all the information necessary for the production of such a system as will be readily understood by the man skilled in the art, and a detailed description of the programming blocks is therefore unnecessary and is not included here.

We claim:

1. A method of assigning a motion vector to a region of an interpolated output video image field to be interpolated between four successive input video fields containing input image values, the method comprising:
   generating for said region of the output video image field, a plurality of possible output field motion vectors from which an output field motion vector is to be selected, each of the possible output field motion vectors being directly assigned to said interpolated output video image field, said interpolated output video image field not being temporally coincident with any of said four successive input video fields;
   projecting each of said possible output field motion vectors from said region of the output video image field through said four successive input video fields by determining four image values, one in each of said four successive input video fields along a projected straight line parallel to each possible vector and passing through said region of the interpolated output video image field;
   comparing image values, or values derived from the image values, in a comparison including values from all four input video fields along each projected possible output field motion vector;
   selecting one of said possible output field motion vectors whereby said region of the interpolated output video image field is identifiable as one of foreground or background, revealed background or obscured background based on the results of the comparison; and
   assigning the selected one output field motion vector to said region of the output video image field.

2. A method according to claim 1, further comprising the step of classifying said region as one of foreground or background, revealed background or obscured background.

3. A method according to claim 1, further comprising the step of determining at least one image value for said region of the output vide image field by projecting at least one image value from at least one of said input video fields along the output field motion vector assigned to said region.

4. A method according to claim 1, in which the image values are luminance values.

5. A method according to claim 1, in which the possible output field motion vectors have an accuracy of better than one pixel, and determining image values for adjacent fields comprises spatially interpolating one of image values or values derived therefrom in the four successive input video fields.

6. A method according to claim 1, in which said region comprises one pixel.

7. A method according to claim 1, in which said region comprises a block of pixels.

8. A method according to claim 1, in which the input image values are high-pass temporally filtered to provide an assignment error value for said region and each of said possible output field motion vectors, and said comparing comprises comparing assignment error values.

9. A method according to claim 8, in which when for said region only one assignment error value is below a threshold, the corresponding output field motion vector is assigned to said region.

10. A method according to claim 8, in which when for said region there is no assignment error value which is below a threshold, the step of comparing further comprises calculating successive inter-field differences for each of said possible output field motion vectors and assigning motion vectors in dependence upon said inter-field differences.

11. A method according to claim 10, in which said inter-field differences are further subjected to spatial filtering.

12. A method according to claim 10, in which said inter-field differences are further subjected to weighting factors.

13. A method according to claim 1, in which the four successive input video fields examined are two central fields and two opposed outer fields.

14. A method according to claim 13, in which when the result of the comparing step between the central fields is below a threshold, but the result of the comparing step between one of the outer fields and the adjacent central field is high, at least the said one of the outer fields is ignored in the step of assigning the selected one output field motion vector.

15. A method according to claim 13, in which when the result of the comparing step between the central fields is high, the result of the comparing step between the previous outer field and the adjacent central field is high, and the result of the comparing step between the following outer field and the adjacent central field is low, the region is identified as revealed background.

16. A method according to claim 15, in which the vector giving the lowest assignment error between the previous outer field and the adjacent central field is also determined and identified as belonging to foreground material adjacent to the region of identified revealed background.

17. A method according to claim 13, in which when the result of the comparing step between the central fields is high, the result of the comparing step between the following outer field and the adjacent central field is high, and the result of the comparing step between the previous outer field and the adjacent central field is low, the region is identified as obscured background.

18. A method according to claim 17, in which the vector giving the lowest assignment error between the following outer field and the adjacent central field is also determined and identified as belonging to foreground material adjacent to the region of identified obscured background.

19. A method according to claim 1, further comprising repeating said assigning step for further regions of said output video image field.

20. A method according to claim 19, further comprising generating an output field intermediate in time between the input fields by motion-compensated interpolation using the motion vector thus assigned.

21. A method according to claim 20, further comprising performing a soft switch between interpolation in areas of revealed or obscured background and areas of foreground by using two vectors determined in such revealed or obscured regions to shift the preceding and following fields in an interpolator.

22. A method according to claim 1, in which assignment errors are determined substantially from the ratio of luminance difference values to the local luminance gradient.

23. A method according to claim 1, where the chrominance difference values along a motion trajectory are used in addition to luminance difference values in calculating an assignment error.

24. A method according to claim 1, in which a plurality of weighted assignment errors are formed by combination of the assignment errors between adjacent fields, and the combined errors are examined when determining whether the region corresponds to foreground, revealed or obscured background.

25. Apparatus for assigning a motion vector to a region of an interpolated output video image field to be interpolated between four successive input video fields containing input image values, the apparatus comprising:

a vector generator for generating for said region of the output video image field, a plurality of possible output field motion vectors from which an output field motion vector is to be selected, whereby the output field motion vectors are directly assignable to said interpolated output video image field that is not temporally coincident with any of the input video fields;

means for projecting each of said possible output field motion vectors from said region of the output video image field through said four successive input video fields by determining four image values, one in each of said four successive input video fields along a projected straight line parallel to each possible vector and passing through said region of the interpolated output video image field;

a comparator for comparing image values, or values derived from the image values, over said four successive input video fields along each projected possible output field motion vector to determine from a comparison involving image values from all four input video fields which of said possible output field motion vectors is most appropriate and whereby said region of the interpolated output video image field is identifiable as one of foreground or background, revealed background or obscured background based on the results of the comparison; and an assignor for assigning the output field motion vector determined to be most appropriate to said region of the output video image field based on the results of said comparing.

26. Apparatus according to claim 25, wherein at least one of said vector generator, said means for projecting, said comparator and said assignor are implemented by a computer system.

* * * * *

UNITED STATES PATENT AND TRADEMARK OFFICE
CERTIFICATE OF CORRECTION

PATENT NO. : 6,005,639
DATED : December 21, 1999
INVENTOR(S) : G. Thomas et al.

It is certified that error appears in the above-identified patent and that said Letters Patent is hereby corrected as shown below:

<u>Title page,</u>
Item [63], delete Related U.S. Application Data, in its entirety and replace therewith the following:

[63] -- Continuation of application No. 08/667,494, Jun. 24, 1996, abandoned, which is a continuation of application No. 07/969,237, Mar. 10, 1993, abandoned, filed as application No. PCT/GB91/01621, Sep. 20, 1991, abandoned. --.

Signed and Sealed this

Eleventh Day of May, 2004

JON W. DUDAS
*Acting Director of the United States Patent and Trademark Office*